Oct. 25, 1932.  A. M. ALGEO ET AL  1,884,967
CONTROL MECHANISM FOR GLASS FEEDERS
Original Filed Feb. 13, 1926  2 Sheets-Sheet 1
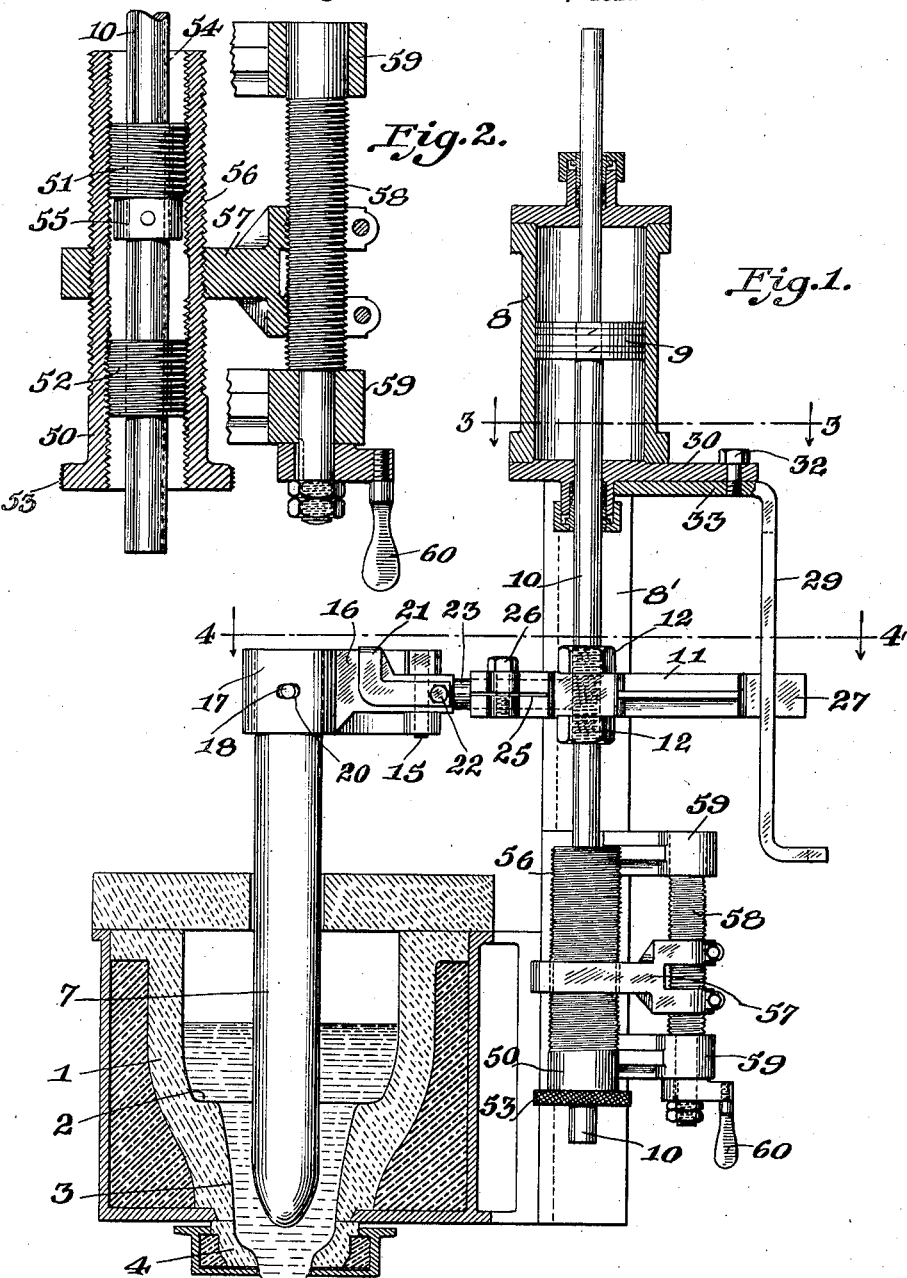

Oct. 25, 1932.  A. M. ALGEO ET AL  1,884,967
CONTROL MECHANISM FOR GLASS FEEDERS
Original Filed Feb. 13, 1926   2 Sheets-Sheet 2
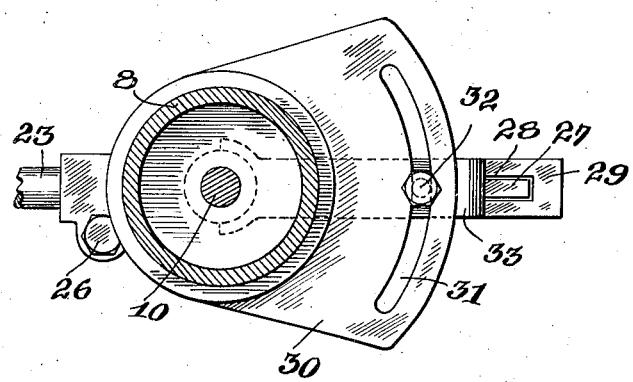
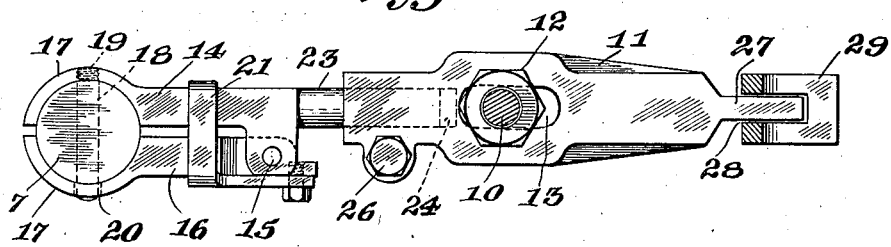
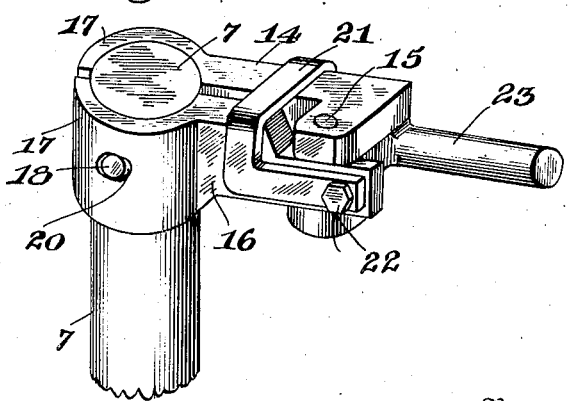
Inventors
Albert M. Algeo
AND James W. Ross
By Eccleston + Eccleston
Attorneys Patented Oct. 25, 1932

1,884,967

UNITED STATES PATENT OFFICE

ALBERT M. ALGEO AND JAMES W. ROSS, OF WASHINGTON, PENNSYLVANIA, ASSIGNORS TO HAZEL-ATLAS GLASS CO., OF WHEELING, WEST VIRGINIA, A CORPORATION OF WEST VIRGINIA

CONTROL MECHANISM FOR GLASS FEEDERS

Application filed February 13, 1926, Serial No. 88,067. Renewed March 3, 1932.

The invention relates generally to glass feeders of the well known reciprocating plunger type, and in particular it relates to certain novel adjustments thereof, the construction and advantages of which will be understood from the following detailed description, taken in connection with the accompanying drawings; in which Figure 1 is an elevational view of the complete apparatus; the flow spout and the feeder operating cylinder being shown in section.

Figure 2 is a vertical sectional view of the vertical adjusting mechanism.

Figure 3 is an enlarged detail horizontal sectional view taken on line 3—3 of Figure 1.

Figure 4 is a horizontal sectional view taken on line 4—4 of Figure 1.

Figure 5 is a detail perspective view of the mounting for the feed control plunger; and Figure 6 is a detail perspective view of the dog for locking the plunger in its mounting.

Referring to the drawings more in detail, numeral 1 indicates the conventional form of flow spout, the floor of which is referred to by numeral 2. The flow spout is provided with the usual well 3, and arranged at the bottom of the well is the usual removable variable size bushing 4, the well and bushing constituting the flow orifice; and arranged below the bushing are the usual shears 5 for severing the gob 6.

The well known reciprocating plug or plunger, indicated by numeral 7, is mounted in the flow spout in vertical alignment with the flow orifice, and with its lower end within the well or flow orifice 3 and 4. It is unnecessary to describe in detail herein the manner in which the gobs are formed by the plug 7, for it is well known in the glass art that the plug alternately accelerates and retards the gravity flow of glass through the well 3 and 4; thereby forming the suspended gobs, which are then severed and drop into molds.

The purpose of the present invention is to provide new and improved means for controlling the operation of the reciprocable plug 7, and such means will now be described.

Numeral 8 refers to the operating cylinder for the reciprocable feeder plug, and this cylinder is, of course, provided with the necessary inlet and exhaust ports and valves (not shown) for controlling the admission and exhaust of compressed air or other motive fluid for causing the reciprocation of the piston 9 and its piston rod 10. The cylinder 8 is shown as mounted on a bracket 8' which, as shown in the drawings, may be carried by the flow spout frame.

The piston rod 10 has mounted thereon, at a suitable point, a cross arm which is referred to generally by numeral 11, and which is shown in detail in Figures 1, 4 and 5.

The cross arm 11 is provided with an opening 13 through which passes the piston rod 10, and the cross arm is locked to the piston rod by means of nuts 12, 12. By reference to Figure 4, it will be observed that the opening 13 is elongated or slotted. It is evident that by means of this elongated opening the cross arm may be moved forwardly or backward in a horizontal plane, to bring the plug 7 carried thereby, in proper alignment with the flow orifice. It will be understood that the adjustment just described is provided so that the feeder is suited to various installations; and the finer adjustments for accurately maintaining the plug aligned with the flow orifice, for overcoming deformations in the plug, etc., will be described below.

The specific means illustrated herein for holding the feeder plug 7, consists of a rigid arm 14 to which is pivotally attached at 15 the swinging arm 16; the two arms being provided at their free ends with fingers 17 which are adapted to embrace the upper end of the plug 7, as clearly illustrated in the drawings.

The upper end of the plug 7 is pierced by a transverse passage extending entirely through the plug, and this passage is adapted to receive a pin 18; one end of the pin being screwed into the fixed finger 17, as indicated by numeral 19, and the other end of the pin is loosely received in an opening 20 in the movable finger 17, the opening 20 being somewhat larger than the pin; so that the arm 16 may be moved back and forth upon its pivot to open and closed position. The arm 16 is locked in closed position by means of a dog 21 which is pivotally mounted at 22 on the swinging arm 16. The sides of the dog 21 converge upwardly very slightly, as clearly illustrated in Figure 6, so that when the dog is forced down the fingers 17 will be drawn together to tightly grip the feeder plug 7.

When it is desired to remove a plug it is only necessary to lift the dog 21, swing the arm 16 outwardly, and remove the plug from the pin 18. A new plug is then mounted on the pin 18, the arm 16 is moved to closed position, and the parts are wedged into plug gripping position by lowering the dog 21.

It will be understood that the specific mechanism for securing the plug is to be considered in an illustrative rather than a limiting sense, for the invention contemplates the use of any suitable means for securing the plug.

A rounded rod 23 is formed integral with and extends from the arm 14, and this rod 23 is fitted into a socket 24 provided in the end of the cross arm 11. The end of the cross arm adjacent the socket is split, as indicated by numeral 25 in Figure 1, and a screw 26 is provided for clamping the socket about the rod 23, for securely maintaining the latter in adjusted position. The construction just described provides two adjustments for the feed plug 7, as indicated below.

It is apparent that by loosening the screw 26 the rod 23 carrying the feeder plug 7, may be adjusted longitudinally in the socket 24, thereby accurately positioning the plug in vertical alignment with the flow orifice; and by setting up on the screw 26 the plug will be maintained in its aligned position.

It will also be apparent that by loosening the screw 26, the rod 23 carrying the feeder plug 7, may be rotated through any desired arc to take care of any deformities in the plug, or for otherwise properly aligning it with the flow orifice. After the rod has been turned through the desired arc it will be maintained in its adjusted position by setting up on the screw 26.

The cross arm 11 carries at its opposite end a finger 27 which, during the reciprocation of the feeder plug 7, travels up and down in a slot 28 provided in the guide member 29; thus maintaining the plug 7 properly aligned with the flow orifice. The cross arm 11 may be turned with the piston rod 10, as a further means for accurately adjusting the feeder plug in alignment with the flow orifice; and for guiding the feeder plug in this adjusted position we have provided means for adjusting the guide member 29. Referring particularly to Figure 3, it will be noted that the lateral extension 30 of the base of cylinder 8, is provided with an arcuate slot 31, and that a screw 32 passes through this slot and screw-threadedly engages the horizontal portion 33 of the guide member 29. To accomplish this adjustment it is only necessary to loosen screw 32 and turn to the desired extent the guide member, the cross arm, the piston rod, and the feeder plug, as a single unit, and then set up on the screw 32.

In the foregoing description we have set forth the manner in which the feeder may be suited to various installations by reason of the adjustment permitted by the elongated opening 13; and we have also set forth the finer adjustments by which the feeder plug may always be accurately aligned with the flow orifice; namely, the longitudinal adjustment of the rod 23 in the socket 24, the turning adjustment of the rod 23 in the socket 24, and the turning adjustment of the cross arm 11. We shall now describe the novel means for readily and sensitively adjusting the length and the limits of the plunger stroke.

Referring now to Figures 1 and 2, numeral 50 indicates a rotatable controller member, in which are mounted two oppositely threaded nuts 51 and 52. The rotatable controller member is preferably knurled at 53, to facilitate the operation thereof. The piston rod 10 passes down through the controller member and through the nuts 51 and 52; the nuts being secured against rotation on the piston rod by means of a key way 54 in the rod, which receives keys (not shown) carried by the nuts.

Pinned or otherwise secured to the lower portion of the piston rod, between the nuts 51, 52, is a collar 55; and it is apparent that as the piston rod is reciprocated by the cylinder 8, its travel, as well as the travel of the feeder plug 7, is limited by the engagement of the collar 55 with the nuts 51, 52.

In the operation of the apparatus thus far described, it is apparent that if the controller 50 be turned in one direction the nuts 51 and 52, will be simultaneously moved in opposite directions away from each other, thereby increasing the length of stroke of the piston rod and feeder plug carried thereby; both the upper and lower limit of stroke being varied. On the other hand, if the controller member be rotated in the opposite direction, the nuts 51 and 52, will be simultaneously moved in opposite directions toward each other, thereby decreasing the length of stroke of the piston rod and feeder plug carried thereby; both the upper and lower limit of the stroke being varied. But the object of the present invention is not to thus simultaneously move the nuts 51 and 52 in opposite directions, to simultaneously vary the upper and lower limit of the plug stroke. On the contrary, one of the objects of the present invention is to provide means varying the upper limit of stroke without varying the lower limit, and we shall now indicate how this is accomplished.

The controller member is screw threaded exteriorly, as indicated by numeral 56, and these threads engage in a bracket 57; so that when the controller member is turned it moves up or down through the bracket 57, depending upon the direction of rotation.

The operation will now be clearly understood. When the controller is turned in one direction the nuts 51 and 52 will be simultaneously moved away from each other, that is, the upper nut will be raised, and the lower nut will be lowered; but when the controller is turned in this direction it will itself be raised due to threads 56 engaging the bracket 57, and the extent that the controller is raised is exactly the same as the extent that the lower nut is lowered; the pitch of the threads on the nuts, and the pitch of the threads 56 being the same. So that the resulting effect is that the lower nut remains unmoved, while the upper nut is moved upwardly to vary the upper limit of the stroke.

If the controller be turned in the opposite direction the nuts 51 and 52 will be simultaneously moved toward each other, that is, the upper nut will be lowered, and the lower nut will be raised; but when the controller is turned in this direction it will itself be lowered due to threads 56 engaging the bracket 57, and the extent that the controller is lowered is exactly the same as the extent that the lower nut is raised. So that the resulting effect is that the lower nut remains unmoved, while the upper nut is moved downwardly to vary the upper limit of the stroke.

It is thus seen that we have provided means by which the upper limit of the feeder stroke may be varied without affecting the lower limit of the feeder stroke.

It is sometimes desirable to simultaneously raise both limits of the feeder stroke, or simultaneously lower both limits of the feeder stroke, and the means by which this is accomplished is described below.

The bracket 57 is mounted on a screw-threaded shaft 58; and the shaft 58 is mounted for rotation, but against longitudinal movement, in journals 59, 59, preferably carried by the bracket 8'. Ball bearing races (not shown) may be provided above and below the lower journal; and the shaft 58 is rotated by means of an operating handle 60 attached to the shaft in any desired manner.

If the shaft 58 is rotated in one direction it will elevate the bracket 57, and thus the controller member and the nuts 51 and 52 will be lifted bodily to an extent depending on the extent of rotation of the shaft 58. It is thus apparent that the extent of travel of the feeder plug remains the same, but the elevation at which the plug reciprocates, has been raised.

If the shaft 58 is rotated in the opposite direction the bracket 57 will be lowered, and the controller member and nuts 51 and 52 will be bodily lowered. Thus the extent of travel of the feeder plug remains the same, but the elevation at which the plug reciprocates, has been lowered.

It will be understood that by the rotation of the controller member 50, the nut 51 may be raised or lowered while the nut 52 remains fixed, whereby the length of the feeder plug stroke is changed, but the lower limit of the stroke remains unchanged. While by the rotation of the screw shaft 58 the nuts 51 and 52 are simultaneously moved the same distance in the same direction, either up or down, thereby maintaining the length of stroke the same but altering the vertical position of the path of the stroke. It is thus seen that nut 51 may be raised or lowered to increase or decrease the length of stroke, and that the nuts 51 and 52 may be simultaneously moved in the same direction and to the same extent, either up or down, to change the vertical position of the path of stroke without changing the length of the stroke; but it is apparent that whatever the adjustment may be, it is impossible to vary the lower limit of the stroke without also varying the upper limit to the same extent.

In accordance with the well known and common practice, the lower end of the plug when at the lower limit of its stroke is always within the well 3 and 4; and, as a matter of fact, the lower end of the plug is practically always within the well, even at the upper limit of its stroke.

Matter shown and described, but not claimed, in this application, is claimed in another application Ser. No. 88,066, filed on even date herewith.

Having fully described the invention, what we claim as new and desire to secure by Letters Patent is:

1. A glass feeder, including a flow spout having a flow orifice, a feeder plug adapted to reciprocate in the flow spout in alignment with the flow orifice, a reciprocable member for operating the feeder plug, a rotatable controller member receiving one end of the reciprocable member, oppositely threaded nuts mounted in said controller and determining the extent of movement of the feeder plug, and said controller member screw-threadedly mounted in a support.

2. A glass feeder, including a flow spout having a flow orifice, a feeder plug adapted to reciprocate in the flow spout in alignment with the flow orifice, a reciprocable member for operating the feeder plug, a rotatable controller member receiving one end of the reciprocable member, oppositely threaded nuts mounted in said controller and determining the extent of movement of the feeder plug, said controller member screw-threadedly mounted in a support, and said support being screw-threadedly mounted on a shaft.

3. A glass feeder including a reciprocable feeder plug, a reciprocable member for reciprocating the plug, a rotatable controller member receiving one end of the reciprocable member, oppositely threaded nuts mounted in the controller member and limiting the extent of movement of the reciprocable member, and means whereby rotation of the controller member will raise or lower one of the nuts while the other nut remains stationary.

4. A glass feeder including a reciprocable feeder plug, a reciprocable member for reciprocating the plug, a rotatable controller member receiving one end of the reciprocable member, oppositely threaded nuts mounted in the controller member and limiting the extent of movement of the reciprocable members, and means whereby rotation of the controller member will raise or lower the upper nut while the lower nut remains stationary.

5. A glass feeder including a reciprocable feeder plug, a reciprocable member for reciprocating the plug, a rotatable controller member receiving one end of the reciprocable member, oppositely threaded nuts mounted in the controller member and limiting the extent of movement of the reciprocable member, means whereby rotation of the controller member will raise or lower the upper nut while the lower nut remains stationary, and means for bodily raising or lowering the controller member and nuts carried thereby.

6. A glass feeder including a reciprocable feeder plug, a cylinder and piston rod for reciprocating the plug, a rotatable controller member receiving one end of the piston rod, oppositely threaded nuts carried by the controller member and limiting the extent of movement of the piston rod, and means for raising or lowering the upper nut while the lower nut remains stationary and for simultaneously raising both nuts and for simultaneously lowering both nuts.

7. A glass feeder including a reciprocable feeder plug, a cylinder and piston rod for reciprocating the plug, a rotatable controller member receiving one end of the piston rod, oppositely threaded nuts carried by the controller member and limiting the extent of movement of the piston rod, a support in which said controller member is screw-threadedly mounted, whereby rotation of the controller member will raise or lower the upper nut while the lower nut remains stationary, and a vertical shaft screw-threadedly engaging said support, whereby the support, the controller, and the nuts, may be raised or lowered bodily.

8. A glass feeder, including a flow spout having a flow orifice, a feeder plug adapted to reciprocate in the flow spout in alignment with the flow orifice, a controller, members carried by the controller for limiting the extent of movement of said plug, said controller being rotatable to move said members simultaneously, said rotation of the controller causing a bodily movement thereof to neutralize the movement of one of said members.

9. A glass feeder, including a flow spout having a flow orifice, a feeder plug adapted to reciprocate in the flow spout in alignment with the flow orifice, a controller, members carried by the controller for limiting the extent of movement of said plug, said controller being rotatable to move said members simultaneously, said rotation of the controller causing bodily movement thereof to neutralize the movement of one of said members, and means for raising and lowering said controller and said limiting members as a unit.

10. A glass feeder, including a flow spout having a flow orifice, a feeder plunger adapted to reciprocate in the flow spout in alignment with the flow orifice, a controller for adjusting the stroke of said plunger, stroke limiting members in said controller, and said controller being rotatable, the rotation of the controller moving the stroke limiting members in opposite directions and simultaneously moving the controller bodily in a direction opposite to and to the same extent as the movement of one of said members.

11. A glass feeder, including a flow spout having a flow orifice, a feeder plunger adapted to reciprocate in the flow spout in alignment with the flow orifice, a controller for adjusting the stroke of said plunger, upper and lower stroke limiting members in said controller, said controller being rotatable, the rotation of the controller moving the stroke limiting members in opposite directions and simultaneously moving the controller bodily in a direction opposite to and to the same extent as the movement of the lower member, and means for bodily raising and lowering said controller.

ALBERT M. ALGEO.
JAMES W. ROSS.